United States Patent [19]

Geiger

[11] Patent Number: 4,575,004
[45] Date of Patent: Mar. 11, 1986

[54] SPRINKLER SYSTEM RETROFIT MECHANISM AND METHOD

[76] Inventor: James E. Geiger, 1044 Rogers St., Broderick, Calif. 95605

[21] Appl. No.: 611,726

[22] Filed: May 18, 1984

[51] Int. Cl.$^4$ .............................................. A01G 27/00
[52] U.S. Cl. ................................... 239/69; 137/624.18
[58] Field of Search ............................. 239/69, 67, 66; 137/624.18, 624.2

[56] References Cited

U.S. PATENT DOCUMENTS 3,578,245  7/1969  Brock .................................... 239/69

Primary Examiner—Andres Kashnikow
Assistant Examiner—Scott D. Malpede
Attorney, Agent, or Firm—David B. Harrison

[57] ABSTRACT

A retrofit mechanism for automatic lawn sprinkler systems. An electrical latching switch which when successively energized switches energizing power to one of two or more conductive paths is housed in a waterproof casing. The retrofit mechanism is installed near an existing electrically operated control valve in an automatic lawn sprinkler control system. The latching switch is wired to the system controller by the wire originally connected to the existing valve. The existing valve and one or more new valves are connected to the conductive paths of the retrofit mechanism. Thus, new valves are added to the automatic sprinkler system without running wiring and conduit between the new valves and the existing controller.

6 Claims, 5 Drawing Figures

SPRINKLER SYSTEM RETROFIT MECHANISM AND METHOD

BACKGROUND OF THE INVENTION

This invention relates to automatic sprinkler systems and in particular to a mechanism which facilitates adding sprinkler heads to an existing automatic control system.

Automatic control systems for timing and sequencing the operation of multiple lawn sprinklers are well known. The simplest of systems contains an electric timer controlling a solenoid valve in the water supply line to the sprinkler heads. By setting the actuation time, the sprinklers are programmed to operate for a predetermined duration at a predetermined time each day. More complex systems operate the sprinkler heads in subsets. This prevents the simultaneous operation of all sprinklers from overloading the water supply capacity which would result in reduced pressure and inadequate lawn coverage. To attain actuation of all sprinklers the subsets are sequenced in and out of operation.

As electronic digital controllers became readily available, they were applied to sprinkler system control. An example of this type of application can be found in U.S. Pat. No. 4,190,884 to Alvaro Medina, issued Feb. 26, 1980. The digital control technology provided exceptional flexibility to the control function. Operation of individual sprinkler heads could be independently programmed in accordance with the requirements of the flora surrounding that sprinkler. In addition, programming flexibility enabled automatic seasonal adjustment of spray duration and automatic program adjustment by either humidity or soil moisture measurement. One of the major benefits of this programming flexibility is the capability to tailor a particular system for varieties of landscaping. Landscaping is generally made to conform to the utilitarian aspects of commercial or residential buildings. Often these utilitarian aspects are modified during the useful life of the building. Rooms or structures may be added or vehicle parking space may be expanded. These modifications can have considerable impact on landscaping with resulting changes to the sprinkler system which can be accommodated by a flexible programming system.

Notwithstanding past improvements in sprinkler systems, a major disadvantage remains. Programming flexibility is limited by the number and location of originally installed sprinkler heads. Landscaping modifications requiring additional sprinkler heads necessitate major piping and wiring changes to incorporate the new sprinkers in the program.

SUMMARY OF THE INVENTION WITH OBJECTS

This invention provides a mechanism which facilitates retrofitting controller-operator lawn sprinkler systems to control additional sprinklers with existing control signal paths from the controller to the sprinkler valves.

A bistable electrical latching relay which when successively energized, switches energizing power to one of two or more conductive paths is housed in a waterproof casing and installed near an existing control valve. The original control wire to the valve is used to energize the latching relay in accordance with the controller program. Each time the relay is energized it alternately selects and energizes contacts. One set of contacts is wired to the existing valve and the other contacts are wired to one or more new valves. In this manner, new valves are added to the system and incorporated into the control program without running any additional wires from the new valves to the controller.

One object of the invention is to facilitate adding automatically controlled sprinklers to an existing automatic sprinkler control system.

Another object of the invention is to increase the flexibility of sprinkler systems to enable full utilization of programming flexibility realized by automatic sprinkler control systems.

Still another object of the invention is to increase the flexibility of flora sprinkler systems to accomodate landscaping modifications.

Yet one more object of the invention is to reduce the labor and cost of modifying automatic sprinkler control systems.

DESCRIPTION OF A PREFERRED EMBODIMENT

Figure 1:
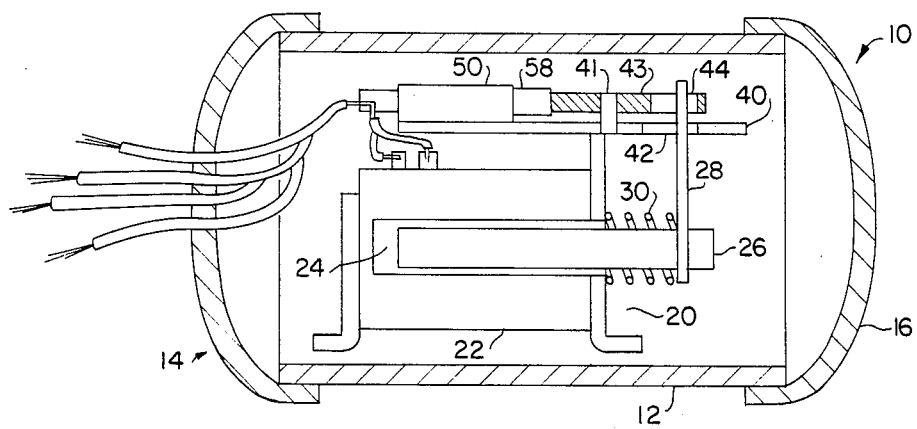
FIG. 1 is a section view of the sprinkler system retrofit mechanism.

Referring to FIG. 1, a sectional view of the sprinkler system retrofit mechanism is depicted. A water tight enclosure, generally designated by reference numeral 10, comprises a cylindrical tube 12 and two end caps 14, 16. The tube 12 and caps 14, 16 are of any suitable water tight material but PVC pipe has been found to give satisfactory results.

Figure 2:
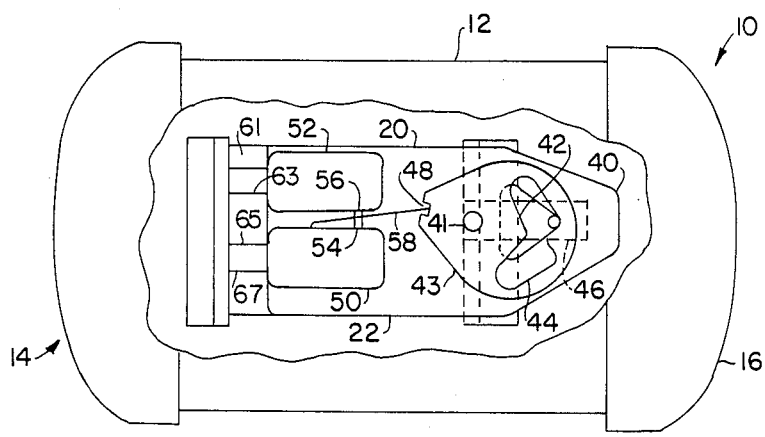
FIG. 2 is a section detail of the relay used in the retrofit mechanism.

Referring to FIGS. 1 and 2, mounted within enclosure 10 is a solenoid operated latching relay 20. Although the presently preferred relay 20 is electromechanically actuated, an electronic bistable switching device, such as a flip-flop, may provide the requisite latched switch function with satisfactory results. The relay consists of a hollow cylindrical coil 22 containing a bore 24 opened at one end. Loosely and rotatably fitting with bore 24 is cylindrical plunger 26 which extends out the opening of coil 22. The distal end of plunger 26 contains a pin 28 extending perpendicular to the axis of plunger 26. Surrounding plunger 26 between the end of coil 22 and pin 28 is a compression spring 30 which urges plunger 26 out of coil 22. Fixedly mounted on top of coil 22 in a plane parallel to the axis of bore 24 is a flat switch mounting plate 40. The plate 40 contains a triangular shaped guide opening 42 through which pin 28 extends. On top of the plate 40, a switch control disk 43 is pivotally mounted on post 41 which is perpendicular to plunger 26 and parallel to pin 28. Disk 43 contains a generally "V" shaped slot 44 located so that it is generally symmetrical about pin 28 which extends through the slot. The edge of the slot furthest from the coil 22 contains a hump 46 located at the apex of the "V" shape thus providing one generally "W" shaped edge to the slot 44. The edge of the disk 43 on the opposite side of pin 28 from slot 44 contains a vertical notch 48. Opposite notch 48 on mounting plate 40 are two single pole double throw switches 50, 52 having actuator buttons 54, 56 arranged to face one another. A lever 58 pivotally mounted to one of switches 50, 52 extends between buttons 54, 56 and engages notch 48. Extending from each switch 50, 52 are two electrical connectors 61, 63, 65, and 67 which engage the normally open and normally closed contacts of the particular switch. Although two stitches are depicted, it is understood that the invention will work with any number of switches.

When coil 22 is de-energized spring 30 holds plunger 26 extended. Pin 28 is held against the apex of triangular shaped guide opening 42. This apex is located directly over the centerline of plunger 26. The pin 28 extends further through slot 44 in disk 43 which is slightly rotated in respect to the centerline of plunger 26. The slight rotation enables pin 26 to rest on one side of the hump 46 in slot 44. The slight rotation also causes lever 58 to be pushed by notch 48 to one side thus holding one switch 50 activated while the opposite switch is deactivated.

Energizing coil 22 draws plunger 26 into bore 24 moving pin 26 toward the coil 22. Pin 26 strikes one of the edges of "V" shaped slot 44. Further movement of the plunger 22 causes pin 26 to slide along the offset edge of slot 44 until further rotation of plunger 22 is prevented by pin 26 engaging the edge of triangular shaped guide opening 42. Further movement of plunger 22 causes disk 43 to rotate about post 41. Rotation of disk 43 activates switch 52 and deactivates switch 50 via lever 58.

In addition, the rotation of disk 43 sets the opposing edge of the "V" shaped slot 44 in line with pin 26 when coil 22 is deenergized and pin 26 is resting in the apex of guide opening 42. Thus, each time coil 22 is energized, disk 43 is rotated to the opposite position changing the state of switches 50, 52. These switches 50, 52 remain in that state until coil 22 is again energized.

INSTALLATION

Figure 3:
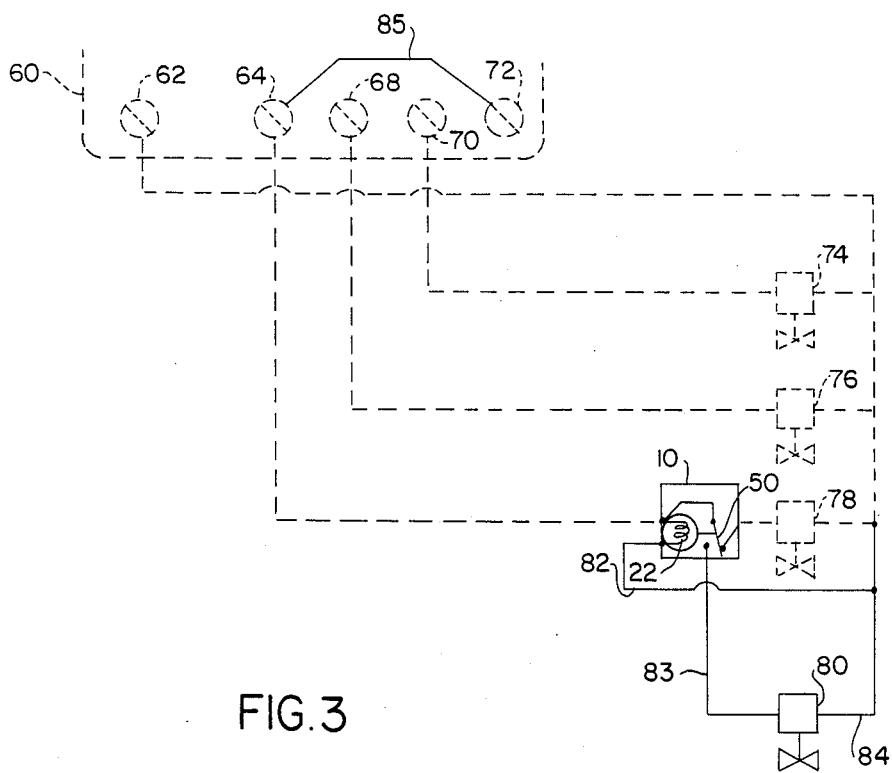
FIG. 3 is an electrical schematic of an automatic sprinkler control system incorporating the retrofit mechanism.

Referring to FIG. 3, an electrical schematic showing the interconnection of the retrofit mechanism in an existing automatic sprinkler control system is depicted. The existing equipment is shown in phantom lines while the add-on equipment is shown in solid lines. The existing sprinker controller is designated generally by the reference numeral 60. The controller may be of many types and manufacturers but generally performs the function of timing and sequencing individual sprinkler conrol valves. The controller contains a number of terminals 62, 64, 68, 70, 72 which are separately wired to sprinkler solenoid valves 74, 76, 78. Terminals 64, 68, 70 provide the timed signals to the valves while terminal 62 acts as a common for all valves. Terminal 72 is shown as being a spare in the existing system. Although it is included in the timing circuitry of the controller 60 it is not wired to any valve.

The valve being added to the system is designated by reference numeral 80 while the retrofit mechanism is shown as 10. The mechanism 10 is installed in an existing control line to any of the existing valves. In FIG. 3 the installation is shown in the line from terminal 64 to valve 78. The line is connected to the coil 22 and the common terminal of the switch 50 in the relay mechanism 10. A new line 82 is connected between coil 22 and the common. In addition, a new line 83 is connected between one of the alternate terminals of switch 50 and the new valve 78. The remaining terminal on switch 50 is connected to existing valve 78. A new line 84 is also added between valve 80 and the common. A jumper 85 is placed between terminal 64 and space terminal 72 on controller 60.

Figure 4A:
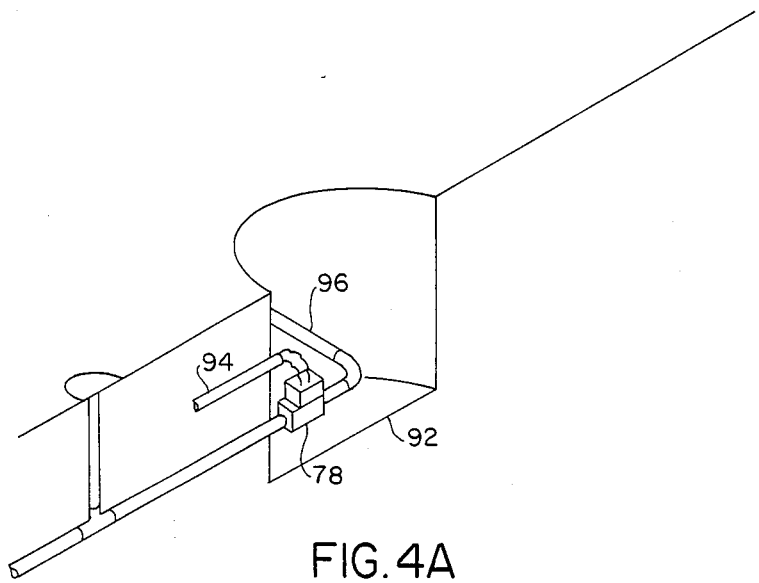
FIG. 4 is two sectional perspective views of a sprinkler piping system, 4A before and 4B after addition of another sprinkler head.
Figure 4B:
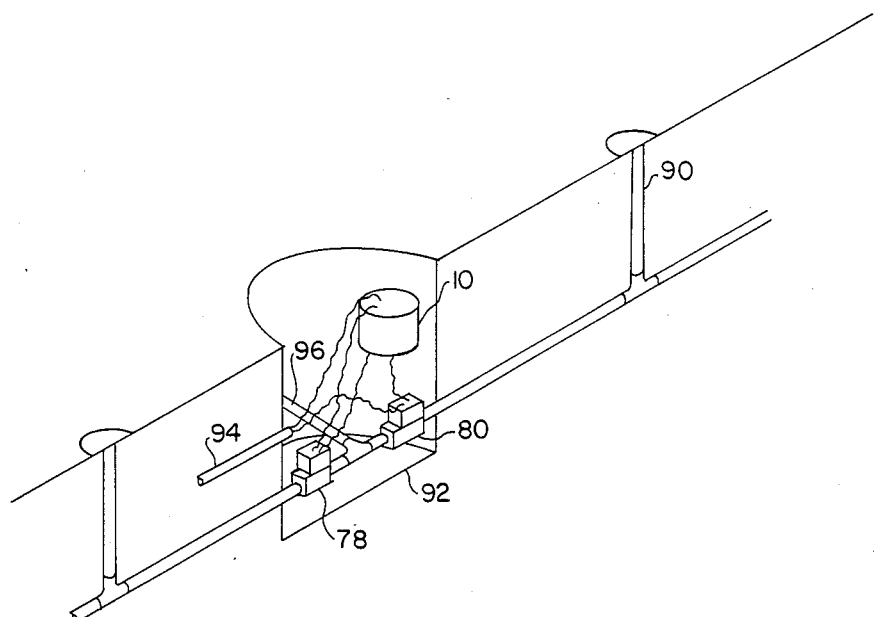

Turning now to FIGS. 4A and 4B the physical piping layout for a sprinkler system is shown. FIG. 4A represents an existing system while FIG. 4B shows the retrofit mechanism 10, the new solenoid valve 80 and a new sprinkler head 90 which have been added to the system. The existing solenoid valve 78 is located in a valve well 92. Conduit 94 brings wiring from the remotely mounted controller (not shown) to the valve well 92. In FIG. 4B, the retrofit mechanism 10 and the new solenoid valve 80 are mounted in the existing well 92. The mechanism 10 is wired, as described above, to the existing valve 78, the new valve 80 and the controller wires in conduit 94. The new valve 80 is piped to the existing water supply pipe 96 and the new sprinkler head 90.

In existing sprinkler systems, the controller is often mounted a considerable distance from the intended location of a new sprinkler head. However, the locations of existing solenoid valves are often dispersed over the entire landscaped area near the existing sprinkler heads. By using the retrofit mechanism, the need to run new conduit and wiring from the controller to the new valve is avoided. By installing the mechanism and the valve in an existing well, considerable cost and labor savings are achieved.

OPERATION

Referring back to FIG. 3 the operation of the system incorporating the retrofit mechanism will be described. For purposes of illustration, it will be assumed that controller 60 is of a very simple type which energizes terminal 64 for one hour. Upon expiration of the hour terminal 64 is deenergized and terminal 68 is energized for one hour. In this manner, the controller sequences through all terminals and then shuts off for 20 hours.

Upon energizing terminal 64, coil 22 in relay mechanism 10 is energized causing switch 50 to change state. Thus, new valve 80 will be energized for the hour causing new sprinkler head 90 to spray in a predetermined pattern. When terminal 72 is energized in the normal sequence, terminal 64 will again be energized by jumper 85. This will again energize coil 22 of mechanism 10 causing switch 50 to change state applying power to solenoid valve 78. Thus, the new sprinkler valve is incorporated into the existing automatic control program without the need to run conduit and wire from the controller 60 to the new valve.

Having thus described the invention, it will now be apparent that the objects of the invention have been fully achieved and it will be understood by those skilled in the art that changes in construction and widely differing embodiments and applications of the invention will suggest themselves without departure from the spirit and scope of the invention. The disclosures and the description herein are purely illustrative and are not intended to be in any sense limiting.

I claim:

1. A retrofit mechanism for an automatic lawn sprinkler system having a plurality of sprinkler heads piped to a water supply via electrically operated valves and an electrical controller for programming the operation of said valves, said retrofit mechanism comprising
   (a) electrical latching switching means which when successively energized alternatively switches energizing power to one of two or more conductive paths, (b) waterproof container means for housing said latching means and (c) conductor means sealingly passing through said container for energizing said latching switching means and connecting said alternate conductive paths to said valves whereby mounting said latching switching means near an existing valve and electrically connecting said existing valve to one of said conductor means attached to one of said conductive paths, electrically connecting a new valve to another conductor means connected to another conductive path and connecting said conductor means for energizing said latching switching means to the wire originally connecting said existing valve to said controller incorporates said new valve into said program without running new wire from said controller to said new valve.

2. A retrofit mechanism as recited in claim 1 wherein said switching means further comprises one or more electromechanical latching relays.

3. A retrofit mechanism as recited in claim 1 wherein said latching means further comprises an electronic flip-flop circuit.

4. A retrofit mechanism as recited in claim 1 wherein said waterproof container means further comprises a pipe with end caps.

5. A retrofit mechanism as recited in claim 4 wherein said pipe and said caps are formed from PVC.

6. The method of adding one or more sprinkler heads to an existing automatic sprinkler system having an electrical controller and one or more existing electrically operated valves controlling the flow of water to one or more sprinkler heads and individual wires from said controller to each of said existing valves wherein the method comprises:

(a) mounting, in a waterproof container, electrical latching switching means for alternately selecting one of two or more conductive paths upon when said latching means is successively energized, (b) connecting said latching switching means to one of said individual wires from said controller to one of said existing valves so that energizing said wire energizes said latching means, (c) connecting by conductive means one of said alternate conducting paths to said one of said existing valves, (d) piping one or more added electrically operated valves to a water supply and to one or more added sprinkler heads, and (e) connecting by conductive means another of said alternate conducting paths to one or more said added electrically operated valves whereby successively energizing said latching switching means alternately energizes said one or more existing valves and said one or more added valves.

* * * * *